(No Model.)

J. W. COLLINS.
HORSE HAY FORK.

No. 379,448. Patented Mar. 13, 1888.

Witnesses:
W. N. Mortimer
L. W. Harris.

Inventor:
James W. Collins,
by R. S. Dyrenforth
his Attorney.

UNITED STATES PATENT OFFICE.

JAMES W. COLLINS, OF CENTRE MONTVILLE, MAINE.

HORSE HAY-FORK.

SPECIFICATION forming part of Letters Patent No. 379,448, dated March 13, 1888.

Application filed October 23, 1886. Serial No. 217,042. (No model.)

*To all whom it may concern:*

Be it known that I, JAMES W. COLLINS, a citizen of the United States, residing at Centre Montville, in the county of Waldo and State of Maine, have invented certain new and useful Improvements in Horse Hay-Forks; and I do hereby declare the following to be a full, clear, and exact description of the invention, such as will enable others skilled in the art to which it appertains to make and use the same.

This invention relates to hay-forks.

The object of the invention is to provide a hay-fork which shall be simple and cheap in construction and much lighter than those heretofore employed; furthermore, to provide a hay-fork which shall be certain and positive in the operation of dumping its load or burden when it has reached its destination; furthermore, to provide a hay-fork in which the dumping-gear is so arranged that the tines can be relieved of their load by the operator independent of the position in which the fork may be, and, finally, to provide a hay-fork so constructed that the tines will assume a vertical or upright position after they have dropped their load, thus better facilitating reloading.

This invention consists, essentially, in a tilting hay-fork composed of an upright bar, the lower end terminating in diverging arms and pivoted to the prongs and converging to a reduced weighted head, and novel latch mechanism for governing the position of the prongs; and, furthermore, the invention consists in a novel latch portion capable of securely holding the weighted head of the tines to the upright bar in a position to be carried to the dumping-pile and of releasing the weighted head preparatory to dumping.

Figure 1:
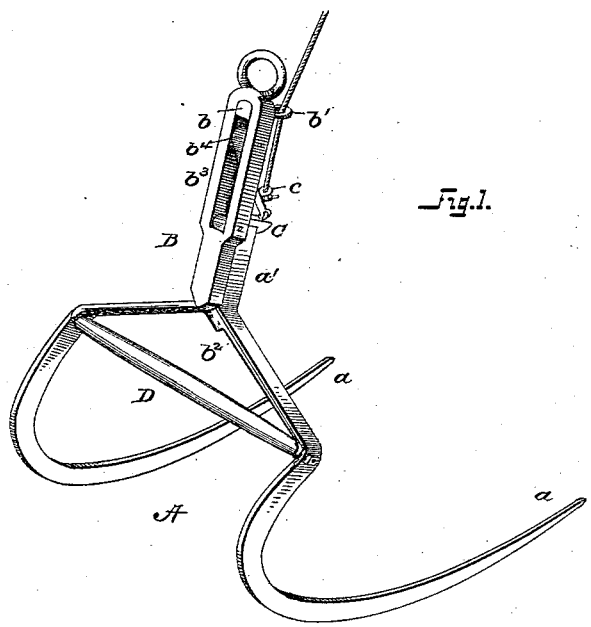
Figure 2:
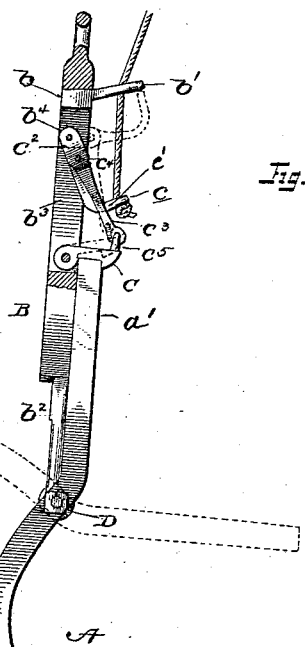

I have illustrated the invention in the accompanying drawings, in which Figure 1 is a perspective view of my improved hay-fork. Fig. 2 is a side elevation, the upper portion of the upright bar being broken away to show the latch mechanism, and indicating by dotted lines the fork in position to receive its load.

In the drawings, A represents the tine portion of the fork, which consists of spread tines $a$ and a weighted head, $a'$, toward which the tines converge.

B is an upright bar provided with a slot, into the upper portion of which is permanently fixed an arm, $b$, which terminates in a loop or ring, $b'$. Through this loop or ring $b'$ passes a rope or line which is connected with lever mechanism that disengages or carries a latch, C, out of engagement with the weighted head $a'$, thus allowing the tine portion of the fork to be tilted, as shown in Fig. 2.

D represents a horizontal rod, by means of which the spread portion of the tines is pivoted to a pronged portion, $b^2$, of the upright bar B. This rod is provided with a sleeve or covering, preferably made of wood, and it acts, further, to support and strengthen the tines and the prong terminals of the upright bar.

The mechanism for operating the latch C is situated in the lower end of a slotted portion, $b^3$, of the upright bar B, and consists of an arm, $c'$, having its outer end slightly curved upward, and provided with a loop or ring, $c$, to which the end of the rope or line which operates the lever mechanism in engaging and disengaging the latch portion C with the weighted head $a'$ is fastened. This lever or arm $c'$ is pivoted at its inner end in the slotted portion of the upright bar B at the point $b^4$. The inner end of this arm or lever $c'$ is made to receive an arm, $c^3$, which is pivoted at the point $c^4$, and is attached to a ring or loop, $c^5$, upon the outer end of the latch C. The arm is attached to the loop or eye $c^5$ and bent back upon itself to form a ring. When the lever or arm $c'$ is moved forward and downward toward the latch C, it engages the latch C with the weighted head $a'$ of the tine portion of the fork, thus forming a straight brace, securely retaining the weighted head $a'$ of the tine portion of the fork on a line with the upright bar B. When in this position, the fork is ready to be hoisted with its load. When the lever or arm $c'$ is moved backward, or away from the latch C, it raises the point $c^4$, and overcomes the straight brace and allows the arm $c^3$ to lift the latch C out of engagement with the weighted head $a'$. Thus the tine portion is tilted, which enables it to drop its load, as fully shown in dotted lines in Fig. 2.

The manner in which the hay-fork is operated is as follows: The operator grasps with one hand the upright bar of the hay-fork, and with the other hand the weighted head of the tine portion of the fork, the fork being in position as shown in dotted lines in Fig. 2. He then plunges the tines of the fork into the hay, thereby getting a load, and then brings the upright bar forward and then downward until the latch engages the weighted head. The lever $c'$ is then forced forward in a manner heretofore described, which securely holds the weighted head. The load is then ready to be hoisted, and is carried to the place where it is to be dumped. The operator, by pulling upon the dump-line, raises the catch, thereby releasing the weighted head, allowing the tines to be tilted, thus dumping the load.
Having thus fully described my invention, what I claim, and desire to secure by Letters Patent, is—

In a horse hay-fork, the combination of an upright bar, B, the lower end terminating in diverging arms $b^2$, which are pivoted to the prongs, said prongs converging above in a reduced weighted head, and a locking mechanism consisting of the latch C, the lever $c'$, and the arm $c^3$, the lever and arm being so joined as to form a straight brace from the point at which the lever is pivoted to the latch, substantially as described.

In testimony whereof I affix my signature in presence of two witnesses.

JAMES W. COLLINS.

Witnesses:
E. BOARDMAN,
N. F. HANEY.